Aug. 27, 1963    K. W. KAMPERT    3,101,854
TRACTOR TOW BAR CONSTRUCTION
Filed Aug. 11, 1961    2 Sheets-Sheet 1
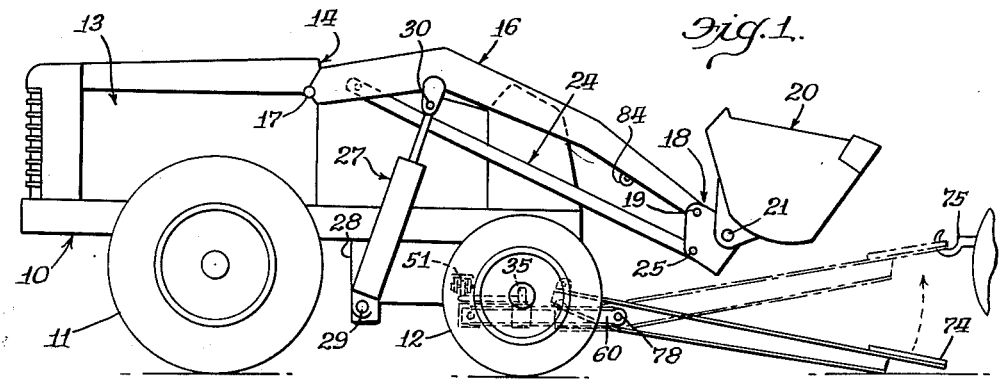
INVENTOR.
Keith W. Kampert
BY Paul O. Pippel
Atty.

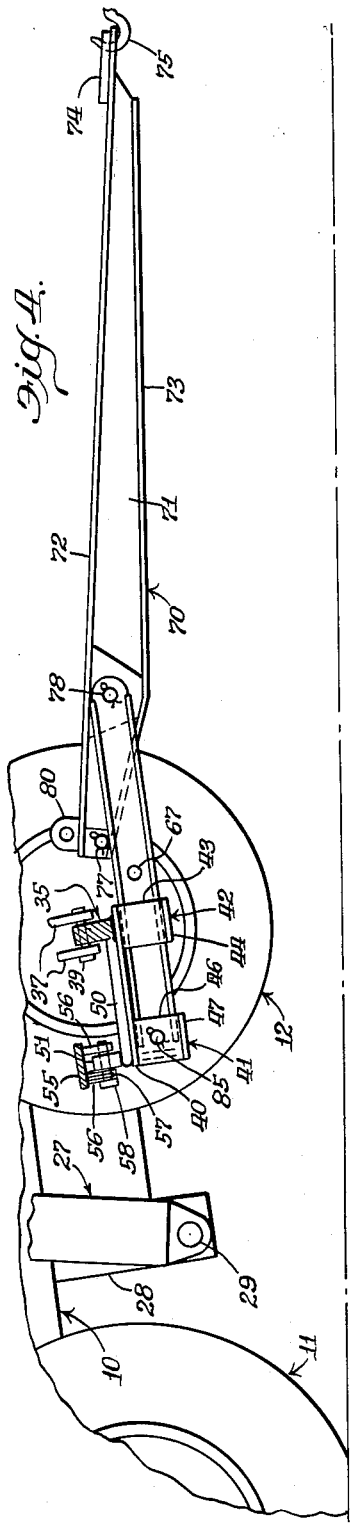

United States Patent Office 3,101,854
Patented Aug. 27, 1963

3,101,854
TRACTOR TOW BAR CONSTRUCTION
Keith W. Kampert, Libertyville, Ill., assignor to The
Frank G. Hough Co., a corporation of Illinois
Filed Aug. 11, 1961, Ser. No. 130,885
21 Claims. (Cl. 214—131)

This invention relates generally to tractor tow bar constructions, and more particularly to a novel integral assembly of a tow bar and a front end type tractor loader.

The primary object of the present invention is to provide a novel, simple and efficient tow bar construction integrally cooperating with a front end type tractor loader.

Another object is to provide a tow bar that will allow a smaller vehicle than the towed vehicle to receive some of the towed vehicle's weight and therefore become more stable while traveling at fast travel speeds; also there is no S turning of the two vehicles that will throw one or both vehicles off the road.

It is a further object to provide a novel tow bar construction for a front end type tractor loader which utilizes the bucket raising arrangement of the tractor loader for operating the tow bar construction.

It is a further object of the present invention to provide a novel tow bar construction for a front end type tractor loader in which a portion of the tow bar construction is permanently carried on the tractor loader and which is movable to one position for towing and to another position for storage during normal operation of the tractor loader.

Other objects and features of the present invention will be apparent upon a perusal of the following specification and drawings in which:

FIGURE 1 is a side elevational view of a front end type tractor loader and the tow bar construction of the present invention;

FIGURE 2 is a view similar to FIGURE 1 but with the tractor loader and tow bar in another operated position thereof;

FIGURE 3 is a view similar to FIGURES 1 and 2 but showing the tractor loader and tow bar construction in a further operated position;

FIGURE 4 is an enlarged partial view of the structure shown in FIGURE 3;

FIGURE 5 is an enlarged view of a portion of the structure shown in FIGURE 4;

FIGURE 6 is a partial view of the structure shown in FIGURE 5 and taken along the line 6—6 of FIGURE 5; and FIGURE 7 is a partial view of the structure shown in FIGURE 5 and taken along the line 7—7 of FIGURE 5.

The present embodiment is the preferred embodiment but it is to be understood that changes can be made in the present embodiment by one skilled in the art without departing from the spirit and scope of the present invention.

Generally, the present invention contemplates a tow bar construction for a front end type tractor loader such, for example, as shown in U.S. Patent No. 2,726,778. As may be seen in the drawings, the tractor loader comprises a bucket which is operatively carried on the forward end of a boom assembly with a pair of hydraulic rams, one on each side of the tractor, for raising and lowering the forward end of the boom to raise and lower the bucket. When such a tractor loader is disabled and requires towing to some remote place for repairs, the present invention provides a novel and unique arrangement for towing of the tractor loader.

A certain slide assembly is permanently carried under and in cooperation with the front axle and frame of the tractor loader. The slide assembly permanently carries a pair of link members which are slidable forwardly of the tractor to a towing position and rearwardly of the tractor to a storage position wherein the tow bar links are disposed in an out-of-the-way position in no way interfering with the normal operation of the tractor loader. A certain tow bar is also provided for connection to and cooperation with the tow bar links by two removable pins.

In the operation of the invention, the rearward portion of the tow bar at a point spaced from the rearward end thereof is raised from the ground and inserted between the forward ends of the tow bar links and a pin is then inserted therethrough. The forward end of the tow bar is then raised and hooked onto a towing vehicle. A heavy chain is then hooked between the rearward end of the tow bar and the boom assembly of the tractor loader intermediate the ends thereof. The boom raising hydraulic rams are then extended. FIGURE 2 shows a partially raised position of the boom wherein the chain is taut but has not as yet raised the front end of the tractor. Further raising of the boom by the boom raising rams causes the forward end of the tractor to be raised about the axis of the rear wheels and the rearward end of the tow bar is raised above the plane defined by the upper surfaces of the tow bar links, as shown in FIGURE 3. A relatively long pin is then inserted in a hole at the rearward end of the tow bar. That pin has a length sufficient to extend over the upper surfaces of both tow bar links. The boom may then be lowered to a position wherein the bucket is conveniently disposed and the chain may be removed. The tractor loader is then prepared for towing to a remote location.

To lower the forward end of the tractor loader to the ground, a substantially reverse procedure is followed. The chain is again hooked between the boom and the rearward end of the tow bar and the boom is raised until the rearward end of the tow bar is slightly raised to permit the pin at the rearward end of the tow bar to be easily manually removed. The boom is then lowered to lower the forward end of the tractor loader until the forward wheels thereof again engage the ground. The boom may then be slightly lowered from a position such as shown in FIGURE 2 to permit the chain to be easily manually unhooked from the boom and the tow bar. The forward end of the tow bar is then unhooked from the towing vehicle and placed upon the ground. The tow bar may then be removed from the tow bar links by a manual removal of the connecting pin therebetween. A further pin which positions the tow bar links in the slide assembly is manually removed and the tow bar links are slid rearwardly to a position such as shown in FIGURE 5 beneath the tractor loader, and the pin reinserted in another hole through the tow bar links to store the tow bar links in an out-of-the-way position beneath the tractor loader.

In detail, the tractor loader comprises a frame 10 carried on a pair of rearward wheels 11 and a pair of forward wheels 12. The frame 10 carries an engine compartment 13 at the rearward portion thereof and an operator's compartment 14 at the forward end thereof. The present embodiment contemplates that the rear wheels 11 are the driven wheels of the tractor and the forward wheels 12 are the steering wheels of the tractor.

A boom 16 which is formed in duplicate portions disposed one on each side of the tractor is pivotally carried on the tractor by pins such as pin 17. The other end of the boom 16 extends forwardly of the tractor and carries a bucket carrier member 18 which is pivotally connected thereto by pin means 19. A digging bucket 20 is pivotally connected to the carrier as at 21. A guide bar 24 formed in duplicate portions disposed on each side of the tractor is pivotally carried at one end thereof on the tractor at a position spaced from pin means 17 of the boom 16. The other end of each portion of the guide bar 24 is pivotally connected to the carrier 18 by pin means 25. The forward end of the boom is raised and lowered by a pair of hydraulic rams 27 disposed one on each side of the tractor. The head end of each hydraulic ram 27 is pivotally connected to a bracket 28 by pin means 29. Each bracket 28 is secured to the frame 10 of the tractor to depend therefrom. The rod end of each hydraulic ram 27 is pivotally connected to one portion of the boom 16 intermediate the ends thereof by pin means 30. Thus it may be seen that when the hydraulic rams 27 are extended, the forward end of the boom is raised relative to the ground. The guide bar 24 is connected between the tractor and the carrier controls the pivotal position of the bucket as the boom is raised and lowered.

Means (not shown) is provided between the carrier 18 and the bucket 20 for controlling the pivotal position of the bucket 20 relative to the carrier 18 for the various operating positions of the bucket 20. A hydraulic system including hydraulic conduits (not shown) is provided for operation of the hydraulic rams 27 under the control of the operator of the tractor loader.

The forward wheels 12 are pivotally carried one at each end of a forward axle 35. A bearing assembly 36 is shown at one end of the axle 35 in FIGURE 7 for carrying a suitable king pin assembly for pivoting of the forward wheels 12. The axle 35 is pivotally connected to the frame 10 of the tractor for oscillation of the forward axle 35 and the forward wheels 12 about a longitudinal center line of the tractor. A pair of flanges 37 are secured to the frame 10 of the tractor to depend therefrom. The flanges 37 are positioned substantially at the transverse center of the frame 10 and are disposed one on each side of the axle 35. The axle 35 is provided with an opening 38 therethrough aligned with a pair of holes through the flanges 37, and a pin 39 is inserted through these holes to mount the axle 35 for oscillation relative to frame 10 of the tractor.

The tow bar slide assembly comprises a substantially rectangular plate 40 carrying two depending slide members 41 and 42. The slide member 42 comprises a pair of side walls 43 and a bottom wall 44. The side walls 43 are secured to the underside of the plate 40 as by welding and are positioned to depend therefrom in a spaced apart relationship to each other. The bottom wall 44 is secured across the lower ends of the side walls 43 by any means such as welding. The slide member 41 similarly comprises a pair of side walls 46 and a bottom wall 47. The side walls 46 are secured to the underside of the plate 40 by some means such as welding and are positioned to depend therefrom in a spaced apart relationship to each other and in longitudinal alignment with the side walls 43 of the slide member 42. The bottom wall 47 of the slide member 41 is secured across the lower end of the side walls 46 by any means such as welding. Each of the side walls 46 of the slide member 41 is provided with a hole therethrough and a sleeve 48 is secured over that hole on the inner side thereof by any means such as welding.

The upper forward end of the plate 40 of the slide assembly is secured to the underside of the axle 35 intermediate the ends thereof by any means such as welding. A brace member 50 is also provided for the slide assembly and is formed of a rod material bent in a somewhat V-shape. The junction of the leg portions of the brace rod 50 is secured to the upper surface of the plate 40 at the rearward end thereof by any means such as welding. The ends of the leg portions of the brace 50 are welded to the axle 35 between the ends of the axle 35 and the plate 40 as may be seen in FIGURE 7. A rectangularly shaped flange 51 is welded to the upper surface of the brace bar 50 at the junction of the legs thereof. The flange 51 has an opening 52 formed therethrough in axial alignment with the hole 38 through the axle 35. The flange 51 provides means for connecting the rearward end of the slide assembly to the tractor. A plate 55, which may be seen in FIGURE 4, is secured to the frame 10 of the tractor by any suitable means and carries a pair of depending flanges 56. The flanges 56 are secured in a spaced apart relationship to each other to depend from the plate 55 substantially at the transverse center of the tractor. One of the flanges 56 is provided with webbing 57 welded thereto and to the underside of the plate 55 to strengthen the assembly. A pin 58 is positioned through a pair of holes in the flanges 56 and the hole 52 in the flange 51 to pivotally support the rearward end of the tow bar slide assembly from the tractor.

The tow bar slide assembly carries a pair of tow bar links 60. Each of the tow bar links is U-shaped in cross section, having a vertical wall 61, an upper wall 62 and a lower wall 63 secured together by some means such as welding. The rearward ends of the vertical wall 61 of the link 60 are secured in a spaced apart relationship to each other by a plate 65 welded therebetween. Each of the links 60 is provided with three holes 66, 67 and 68 through the vertical walls 61 thereof. The holes 66 are disposed at the forward end of the links 60, and the holes 68 are disposed at the rearward end thereof. The holes 67 (see FIG. 4) are disposed intermediate the ends of the links 60 so that when the links 60 are moved to a retracted or storage position relative to the slide assembly such as shown in FIGURE 5, the holes 67 are in axial alignment with the sleeves 48 of the rearward slide assemblies 41. When the holes 68 are in axial alignment with the sleeves 48, the forward end of the links 60 are positioned forwardly of the forward edge of the tractor wheels 12, as seen in FIGURE 4. FIGURE 6 clearly shows the sliding relationship of the links 60 in the slide assembly.

The tow bar 70 is formed in a box section and comprises a pair of spaced apart side walls, such as side wall 71, interconnected by a top wall 72 and a bottom wall 73 by any means such as welding. The forward end of the tow bar 70 carries a hookeye assembly 74 for connection to the towing hook 75 of a towing vehicle. The rearward portion of the tow bar 70 has a pair of spaced apart holes formed therethrough. One of the holes carries the pin 77 in FIGURE 4 and the other hole is aligned with the hole 66 in the forward end of the tow bar links 60 in FIGURE 4. A pin 78 as shown in FIGURE 4 is disposed through those holes. The upper wall 72 of the tow bar 70 at the rearward end thereof carries a hookeye 80 welded thereon for accepting the hook at one end of the chain 81 of FIGURES 2 and 3. The tow bar 70 has a width substantially equal to the distance between the vertical walls 61 of the links 60, which spacing may easily be seen in FIGURE 6.

The invention further comprises a brace member 83 carried by the boom 16 as shown in FIGURES 2 and 3. The brace member 83 extends between the two boom arms which make up the boom 16 intermediate the ends thereof and may be of any suitable construction providing sufficient strength to permit raising of the forward end of the tractor. The embodiment shown comprises forming the brace member 83 of a length of angle iron and a plate member. The plate member is welded across the legs of the angle iron and the integral assembly is secured between the boom arms of the boom 16 by any means such as welding. A hookeye 84 is secured to the brace 83 to depend therefrom intermediate the ends thereof. The hookeye 84 is provided for the hook at the other end of the chain 81.

From the foregoing, it may be seen that operation of the invention entails first positioning the links 60 in the forward position shown in FIGURE 4, that wherein the holes 68 are in axial alignment with the sleeves 48 in the slide assembly and then in inserting a pin such as pin 85 of FIGURE 4 through those holes. Assuming the tow bar 70 is initially resting upon the ground, the rearward portion thereof is manually raised and inserted between the forward ends of the links 60 with the holes 66 of the links 60 in axial alignment with the holes through the tow bar 70 which are spaced from the rearward end thereof. The pin 78 is then inserted through those holes and the invention is then positioned such as shown in FIGURE 1. The forward end of the tow bar 70 is then raised and the hookeye 74 is hooked onto the towing hook 75 of the towing vehicle. The invention then is positioned as shown in the dotted lines of FIGURE 1. The chain 81 is then hooked at one end in the hookeye 80 of the tow bar and the other end is hooked in the hookeye 84 of the brace 83 of the boom 16. A slight raising of the boom 16 by partial extensions of the hydraulic rams 27 will bring the invention to a position such as shown in FIGURE 2.

The tractor loader is then ready for raising of the forward end thereof from the ground. Further extensions of the hydraulic rams 27 to a position such as shown by the dotted lines in FIGURE 3 will bring the rearward end of the tow bar 70 substantially above the upper walls 62 of the links 60 as the forward wheels 12 are raised from the ground. The pin 77 is then inserted through the holes at the rearward end of the tow bar 70 and axially positioned so that sufficient portions of the pin 77 extend beyond each side of the tow bar 70 to extend substantially over the upper wall 62 of the links 60. A slight retraction of the hydraulic rams 27 to bring the boom 16 from the dotted line position of FIGURE 3 to the solid line position thereof will carry the pin 77 downwardly to rest upon the upper walls 62 of the links 60 such as shown in FIGURES 3 and 4. The boom 16 may be further lowered to bring the bucket to a convenient towing position and the chain 81 is removed. The tractor loader is then ready for towing.

A reverse procedure is followed to again return the forward wheels 12 to the ground. When the tow bar 70 is disconnected from the links 60, the links 60 are pushed rearwardly in the slide assembly until the holes 67 are in axial alignment with the sleeves 48. The pin 85 is then inserted through those axially aligned holes to secure the links 60 in the storage position beneath the tractor loader as shown in FIGURE 5.

What is considered new and desired to be protected by Letters Patent is:

1. A tow bar arrangement for a front end type tractor loader providing an operable boom means; and said tow bar arrangement comprising, link means carried at the lower end of said tractor and extending forwardly thereof, a tow bar, means for pivotally connecting said tow bar at a position spaced from the rearward end thereof to the forward end of said link means, a link connectable between the rearward end of said tow bar and said boom means of said tractor loader for raising the rearward end of said tow bar above said link means contemporaneously with the raising of the forward end of said tractor above the ground by operatively raising said boom means when the forward end of said tow bar is connected to a towing vehicle, and means on the rearward end of said tow bar cooperating with said link means for preventing the rearward end of said tow bar from moving below said link means when said boom is lowered to lower said link.

2. A tow bar arrangement for a front end type loader providing an operable boom means; and said tow bar arrangement comprising a tow bar, a link means carried at the lower forward end of said tractor and extending forwardly thereof, a tow bar, means for pivotally connecting said tow bar at a position spaced from the rearward end thereof to the forward end of said link means, a link connectable between the rearward end of said tow bar and said boom means of said tractor loader for raising the rearward end of said tow bar above said link means contemporaneously with the raising of the forward end of said tractor above the ground by raising said boom when the forward end of said tow bar is connected to a towing vehicle, and a pin insertable through a hole in the rearward end of said tow bar, said pin having a length sufficient to cooperate with said link means to prevent the rearward end of said tow bar from moving below said link means when said boom is lowered to lower said link.

3. A tow bar arrangement for a front end type tractor loader including operable boom means; and said tow bar arrangement comprising, a pair of links carried on the lower forward end of said tractor to extend forwardly thereof, a tow bar, means for pivotally connecting said tow bar at a position spaced from the rearward end thereof between and to the forward end of said pair of links, a flexible link connectable between the rearward end of said tow bar and said boom means of said tractor loader for pivoting said tow bar about the pivotal connection thereof to said pair of links to raise the rearward end of said tow bar above said pair of links contemporaneously with the raising of the forward end of said tractor loader above the ground by raising said boom means when the forward end of said tow bar is connected to a towing vehicle, and means on the rearward end of said tow bar cooperating with the upper surface of said pair of links to prevent the rearward end of said tow bar from moving below said pair of links when said boom means is lowered to lower said flexible link.

4. In a tow bar arrangement as defined in claim 3, wherein said last mentioned means comprises a hole through the rearward end of said tow bar and a pin insertable through said hole, said pin having a length sufficient to engage and rest upon the upper surfaces of said pair of links when said boom is lowered to lower said flexible link.

5. A tow bar arrangement for a front end type tractor loader having an operable boom means and a rigid front axle connected to the frame of said tractor for oscillation of said axle about a longitudinal center line of said tractor loader; and said tow bar arrangement comprising, link means secured to the underside of said axle intermediate the ends thereof, means secured to the upper side of said link means at a position spaced longitudinally rearwardly of the connection of said link means to said axle for pivotally connecting said link means to the underside of said tractor for pivotal movement about the axis of oscillation of said axle, said link means further being positioned to extend forwardly of said tractor, a tow bar, means for pivotally connecting said tow bar at a position spaced from the rearward end thereof to the forward end of said link means, a flexible link connectable between the rearward end of said tow bar and said boom of said tractor loader for raising the rearward end of said tow bar above said link means contemporaneously with the raising of the forward end of said tractor above the ground by raising said boom means when the forward end of said tow bar is connected to a towing vehicle, and means on the rearward end of said tow bar cooperating with said link means to prevent the rearward end of said tow bar from moving below said link means when said boom means is lowered to lower said flexible link.

6. A tow bar arrangement for a front end type tractor loader having an operable boom means and a rigid front axle connected to the frame of said tractor for oscillation of said axle about a longitudinal center line of said tractor loader; said tow bar arrangement comprising, link means secured to the underside of said axle intermediate the ends thereof, means secured to the upper side of said link means at a position spaced longitudinally rearwardly of the connection of said link means to said axle for pivotally connecting said link means to the underside of said tractor for pivotal movement about the axis of oscillation of said axle, said link means further being positioned to extend forwardly of said tractor, a tow bar, means for pivotally connecting said tow bar at a position spaced from the rearward end thereof to the forward end of said link means, a flexible link connectable between the rearward end of said tow bar and said boom means of said tractor loader for raising the rearward end of said tow bar above said link means contemporaneously with the raising of the forward end of said tractor above the ground by raising said boom means when the forward end of said tow bar is connected to a towing vehicle, and a pin insertable through a hole in the rearward end of said tow bar, said pin having a length sufficient to cooperate with said link means to prevent the rearward end of said tow bar from moving below said link means when said boom means is lowered to lower said flexible link.

7. A tow bar arrangement for a front end type tractor loader having an operable boom means, a rigid front axle connected to the frame of said tractor for oscillation of said axle about a longitudinal center line of said tractor comprising, a pair of links carried on the underside of said axle intermediate the ends thereof, means carrying the rearward end of said pair of links at a position spaced longitudinally rearwardly of the connection of said pair of links to said axle for pivotally connecting said pair of links to the underside of said tractor for pivotal movement about the axis of oscillation of said axle, a tow bar, means for pivotally connecting said tow bar at a position spaced from the rearward end thereof between and to the forward end of said pair of links, a flexible link connectable between the rearward end of said tow bar and said boom means of said tractor loader for pivoting said tow bar about the pivotal connection thereof to said pair of links to raise the rearward end of said tow bar above said pair of links contemporaneously with the raising of the forward end of said tractor loader above the ground by raising said boom means when the forward end of said tow bar is connected to a towing vehicle, and means on the rearward end of said tow bar cooperating with the upper surfaces of said pair of links to prevent the rearward end of said tow bar from moving below said pair of links when said boom means is lowered to lower said flexible link.

8. In a tow bar arrangement as defined in claim 7, wherein said last mentioned means comprises a hole through the rearward end of said tow bar and a pin insertable through said hole, said pin having a length sufficint to engage and rest upon the upper surfaces of said pair of links when said boom is lowered to lower said flexible link.

9. A tow bar arrangement for a front end type tractor loader having an operable boom means; said tow bar arrangement comprising, slide means carried at the lower forward end of said tractor, link means slidably carried in said slide means, means for selectively securing said link means in said slide means in a forward towing position or a rearward storage position, a tow bar, means for pivotally connecting said tow bar at a position spaced from the rearward end thereof to the forward end of said link means when said link means is in a forward towing position, a flexible link connectable between the rearward end of said tow bar and said boom means of said tractor loader for pivoting said tow bar to raise the rearward end of said tow bar above said link means contempraneously with the raising of the forward end of said tractor above the ground by raising said boom means when the forward end of said tow bar is connected to a towing vehicle, and means on the rearward end of said tow bar cooperating with said link means to prevent the rearward end of said tow bar from moving below said link means when said boom means is lowered to lower said flexible link.

10. A tow bar arrangement for a front end type tractor loader including an operable boom means; said tow bar arrangement comprising, slide means carried at the lower forward end of said tractor, link means slidably carried in said slide means, means for selectively securing said link means in said slide means in a forward towing position or a rearward storage position, a tow bar, means for pivotally connecting said tow bar at a position spaced from the rearward end thereof to the forward end of said link means when said link means is in a forward towing position, a flexible link connectable between the rearward end of said tow bar and said boom means of said tractor loader for raising the rearward end of said tow bar above said link means contemporaneously with the raising of the forward end of said tractor loader above the ground by raising said boom means when the forward end of said tow bar is connected to a towing vehicle, and a pin insertable through a hole in the rearward end of said tow bar, said pin having a length sufficient to cooperate with said link means to prevent the rearward end of said tow bar from moving below said link means when said boom means is lowered to lower said link.

11. A tow bar arrangement for a front end type tractor loader including an operable boom means; said tow bar arrangement comprising, slide means carried at the lower forward end of said tractor, a pair of links slidably carried in said slide means, means for selectively securing said pair of links in said slide means in a forward towing position or a rearward storage position, a tow bar, means for pivotally connecting said tow bar at a position spaced from the rearward end thereof between and to the forward end of said pair of links when said pair of links is in a forward towing position, a flexible link connectable between the rearward end of said tow bar and said boom means of said tractor loader for pivoting said tow bar to raise the rearward end thereof above said pair of links contemporaneously with the raising of the forward end of said tractor loader above the ground by raising said boom means when the forward end of said tow bar is connected to a towing vehicle, and means on the rearward end of said tow bar cooperating with the upper surface of said pair of links to prevent the rearward end of said tow bar from moving below said pair of links when said boom means is lowered to lower said flexible link.

12. In a tow bar arrangement as defined in claim 11, wherein said last mentioned means comprises a hole through the rearward end of said tow bar and a pin insertable through said hole, said pin having a length sufficient to engage and rest upon the upper surfaces of said pair of links when said boom is lowered to lower said flexible link.

13. A tow bar arrangement for a tractor having an operable boom means and a rigid front axle connected to the frame of said tractor for oscillation of said axle about a longitudinal center line of said tractor; said tow bar arrangement comprising, slide means secured at the upper forward end thereof to the underside of said axle intermediate the ends thereof, means secured to the upper side of said slide means at a position spaced longitudinally rearwardly of the connection of said slide means to said axle for pivotally connecting said slide means to the underside of said tractor for pivotal movement about the axis of oscillation of said axle, link means slidably carried in said slide means, means for selectively securing said link means in said slide means in a forward towing position or a rearward storage position, a tow bar, means for pivotally connecting said tow bar at a position spaced from the rearward end thereof to the forward end of said link means when said link means is in the forward towing position, a flexible link connectable between the rearward end of said tow bar and said boom means of said tractor loader for pivoting said tow bar to raise the rearward end of said tow bar above said link means contemporaneously with the raising of the forward end of said tractor above the ground by raising said boom means when the forward end of said tow bar is connected to a towing vehicle, and means on the rearward end of said tow bar cooperating with said link means to prevent the rearward end of said tow bar from moving below said link means when said boom means is lowered to lower said flexible link.

14. A tow bar arrangement as defined in claim 13, wherein said last mentioned means comprises a hole in the rearward end of said tow bar, and a pin insertable through said hole, said pin having a length sufficient to cooperate with said link means to prevent the rearward end of said tow bar from moving below said link means when said boom is lowered to lower said flexible link.

15. A tow bar arrangement for a tractor having an operable boom means and a rigid front axle connected to the frame of said tractor for oscillation of said axle about a longitudinal center line of said tractor; said tow bar arrangement comprising, slide means secured at the upper forward end thereof to the underside of said axle intermediate the ends thereof, means secured to the upper side of said slide means at a position spaced longitudinally rearwardly of the connection of said slide means to said axle for pivotally connecting said slide means to the underside of said tractor for pivotal movement about the axis of oscillation of said axle, a pair of links slidably carried in a parallel spaced apart relationship to each other in said slide means, means for selectively securing said pair of links in a forward towing position or a rearward storage position, a tow bar, means for pivotally connecting said tow bar at a position spaced from the rearward end thereof between and to the forward end of said pair of links when said pair of links is in a forward towing position, a flexible link connectable between the rearward end of said tow bar and said boom means of said tractor for pivoting said tow bar to raise the rearward end of said tow bar above said pair of links contemporaneously with the raising of the forward end of said tractor above the ground by raising said boom means when the forward end of said tow bar is connected to a towing vehicle, and means on the rearward end of said tow bar cooperating with the upper surface of said pair of links to prevent the rearward end of said tow bar from moving below said pair of links when said boom means is lowered to lower said flexible link.

16. In a tow bar arrangement as defined in claim 15, wherein said last mentioned means comprises a hole through the rearward end of said tow bar and a pin insertable through said hole, said pin having a length sufficient to engage and rest upon the upper surfaces of said pair of links when said boom means is lowered to lower said flexible link.

17. In a tow bar arrangement defined in claim 15, wherein said means for selectively securing said pair of links in said slide means comprises a pair of longitudinally spaced apart holes formed through each of said pair of links, a hole formed through said slide means, and a pin insertable through said hole in said slide means and selected ones of said holes of said pairs of holes of said pair of links, each pair of holes in said pair of links being positioned so that said pair of links are positioned in said forward towing position when said pin is inserted in one of the holes of each pair of holes of said pair of links and so that said pair of links are positioned in the rearward storage position when said pin is inserted in the other hole of each pair of holes of said pair of links.

18. A tow bar arrangement for a towed vehicle including actuating means operatively carried thereon; said tow bar arrangement comprising, a link means carried at one end of said towed vehicle and extending forwardly thereof, a tow bar, means for pivotally connecting said tow bar intermediate the ends thereof to the forward end of said link means, a link connectable between the rearward end of said tow bar and said actuating means such that operation of said actuating means of said towed vehicle for raising said link and the rearward end of said tow bar above said link means simultaneously with the raising of one end of said towed vehicle above the ground when the forward end of said tow bar is connected to a towing vehicle, and means on the rearward end of said tow bar cooperating with said link means for preventing the rearward end of said tow bar from moving below said link means when said actuating means is operated for lowering.

19. A tow bar arrangement for a towed vehicle including actuating means operatively carried thereon; said tow bar arrangement comprising, a link means carried at one end of said towed vehicle and extending forwardly thereof, a tow bar, means for pivotally connecting said tow bar intermediate the ends thereof to the forward end of said link means, said actuating means being removably connected to the rearward end of said tow bar such that operation of said actuating means for raising the rearward end of said tow bar above said link means simultaneously with the raising of one end of said towed vehicle above the ground by operation of said actuating means when the forward end of said tow bar is connected to a towing vehicle, and means on the rearward end of said tow bar cooperating with said link means for preventing the rearward end of said tow bar from moving below said link means when said actuating means is operated for lowering of the rearward end of said tow bar.

20. A tow bar arrangement for a towed vehicle including actuating means operatively carried thereon; said tow bar arrangement comprising, a slide means secured at one end of said towed vehicle for pivotal movement about a longitudinal axis of said towed vehicle, a pair of links slidably carried in a parallel spaced-apart relationship to each other in said slide means, means for selectively securing said pair of links in a forward towing position or a rearward storage position in said slide means, a tow bar, means for pivotally connecting said tow bar intermediate the ends thereof to the forward end of said pair of links when said pair of links is in a forward towing position, said actuating means being movably connected to the rearward end of said tow bar such that operation of said actuating means for raising the rearward end of said tow bar above said pair of links in the forward towing position simultaneously with the raising of one end of said towed vehicle above the ground by operation of said actuating means when the forward end of said tow bar is connected to a towing vehicle, and means on the rearward end of said tow bar cooperating with said pair of links in the forward towing position for preventing the rearward end of said tow bar from moving below said pair of forwardly positioned links when said actuating means is operated for lowering of the rearward end of said tow bar.

21. In combination a tow bar arrangement and a towed vehicle, said towed vehicle comprising an actuating means operatively carried thereon, said tow bar arrangement comprising a tow bar and a link means, said link means carried at one end of said towed vehicle and extending forwardly thereof, means for pivotally connecting said tow bar intermediate the ends thereof to the forward end of said link means, said actuating means being removably connected to the rearward end of said tow bar such that operation of said actuating means for raising the rearward end of said tow bar above said link means simultaneously with the raising of one of said towed vehicle above the ground by operation of said actuating means when the forward end of said tow bar is connected to a towing vehicle, and means on the rearward end of said tow bar cooperating with said link means for preventing the rearward end of said tow bar from moving below said link means when said actuating means is operated for lowering of the rearward end of said tow bar.

References Cited in the file of this patent

UNITED STATES PATENTS

| | | |
|---|---|---|
| 2,126,819 | Schawlem | Aug. 16, 1938 |
| 2,496,515 | Bayes | Feb. 7, 1950 |
| 2,791,444 | McNeice | May 7, 1957 |
| 2,916,301 | Cushman | Dec. 8, 1959 |

FOREIGN PATENTS

| | | |
|---|---|---|
| 760,688 | Great Britain | Nov. 7, 1956 |